(12) United States Patent
Yokoyama et al.

(10) Patent No.: US 10,358,947 B2
(45) Date of Patent: Jul. 23, 2019

(54) COMBINED CYCLE GAS TURBINE PLANT

(71) Applicants:MITSUBISHI HITACHI POWER SYSTEMS, LTD., Yokohama (JP); MITSUBISHI HITACHI POWER SYSTEMS EUROPE, LTD., London (GB)

(72) Inventors: Yoshiyuki Yokoyama, Tokyo (JP); Jose Manuel Martinez, London (GB); Elvio Rubio, London (GB); Pablo Ratia, London (GB)

(73) Assignees: MITSUBISHI HITACHI POWER SYSTEMS, LTD., Yokohama-shi (JP); MITSUBISHI HITACHI POWER SYSTEMS EUROPE, LTD., London (GB)

( * ) Notice: Subject to any disclaimer, the term of this patent is extended or adjusted under 35 U.S.C. 154(b) by 506 days.

(21) Appl. No.: 15/121,587

(22) PCT Filed: Mar. 27, 2015

(86) PCT No.: PCT/JP2015/060532
§ 371 (c)(1),
(2) Date: Aug. 25, 2016

(87) PCT Pub. No.: WO2015/147342
PCT Pub. Date: Oct. 1, 2015

(65) Prior Publication Data
US 2016/0363008 A1    Dec. 15, 2016

(30) Foreign Application Priority Data

Mar. 28, 2014    (GB) .................................. 1405605.5

(51) Int. Cl.
*F01K 23/10*        (2006.01)
*F02C 9/42*         (2006.01)
(Continued)

(52) U.S. Cl.
CPC ................. *F01K 23/10* (2013.01); *F01K 5/02* (2013.01); *F01K 7/345* (2013.01); *F01K 23/101* (2013.01);
(Continued)

(58) Field of Classification Search
CPC ............. F01K 7/345; F01K 23/10; F02C 3/04
See application file for complete search history.

(56) References Cited

U.S. PATENT DOCUMENTS 4,896,498 A * 1/1990 Knizia .................. F01K 23/067
60/39.12
6,560,966 B1 * 5/2003 Fetescu ................. F01K 21/047
60/728

(Continued)

FOREIGN PATENT DOCUMENTS

CN    1464947    12/2003
CN    1580501    2/2005
(Continued)

OTHER PUBLICATIONS

First Office Action dated Feb. 4, 2017 in corresponding Chinese Application No. 201580010187.6 (with English translation).
(Continued)

*Primary Examiner* — Mark A Laurenzi
*Assistant Examiner* — Shafiq Mian
(74) *Attorney, Agent, or Firm* — Wenderoth, Lind & Ponack, L.L.P.

(57) ABSTRACT

This combined cycle gas turbine plant has a gas turbine (104) and a steam turbine (106) mounted on the same shaft. A control system is configured for switching the plant from a rated mode of operation, in which the plant is operated on gas turbine output and steam turbine output, to a reduced load mode of operation, in which the plant is operated on gas turbine output alone. The switch from the rated mode of
(Continued)

operation to the reduced load mode of operation occurs if plant demand decreases below a predetermined threshold. The steam turbine is run under full speed no load conditions in the reduced load mode of operation, and is heated using controlled steam admission, to maintain the steam turbine in a heated 'stand-by' state.

23 Claims, 5 Drawing Sheets

(51) Int. Cl.
| | |
|---|---|
| F01K 5/02 | (2006.01) |
| F01K 7/34 | (2006.01) |
| F02C 3/04 | (2006.01) |
| H02K 7/18 | (2006.01) |
| F01K 23/16 | (2006.01) |

(52) U.S. Cl.
CPC .............. F01K 23/16 (2013.01); F02C 3/04 (2013.01); F02C 9/42 (2013.01); H02K 7/1823 (2013.01); *F05D 2210/13* (2013.01); *F05D 2220/31* (2013.01); *F05D 2220/32* (2013.01); *F05D 2220/62* (2013.01); *Y02E 20/16* (2013.01)

(56) References Cited

U.S. PATENT DOCUMENTS

| | | | | |
|---|---|---|---|---|
| 6,786,034 | B2 * | 9/2004 | Liebig | ................. F01K 23/10 60/39.41 |
| 8,051,654 | B2 * | 11/2011 | Kirzhner | ............... F01K 23/101 60/39.15 |
| 8,386,147 | B2 * | 2/2013 | Tanaka | ................... F02C 7/047 60/266 |
| 2004/0011040 | A1 | 1/2004 | Tanaka et al. | |
| 2004/0045299 | A1 | 3/2004 | Blatter et al. | |
| 2004/0055272 | A1 | 3/2004 | Tanaka | |
| 2004/0159105 | A1 | 8/2004 | Tanaka et al. | |
| 2005/0022497 | A1 | 2/2005 | Takai et al. | |
| 2005/0074049 | A1 | 4/2005 | Tanaka et al. | |
| 2005/0183422 | A1 | 8/2005 | Takai et al. | |
| 2006/0032232 | A1 | 2/2006 | Takai et al. | |
| 2006/0123767 | A1 * | 6/2006 | Briesch | ..................... F01K 9/00 60/39.182 |
| 2009/0056341 | A1 | 3/2009 | Sanchez et al. | |
| 2009/0064656 | A1 * | 3/2009 | Oomens | ................. F01K 23/10 60/39.182 |
| 2015/0107258 | A1 * | 4/2015 | Rofa | ........................ F02C 6/18 60/775 |

FOREIGN PATENT DOCUMENTS

| | | |
|---|---|---|
| CN | 1603578 | 4/2005 |
| DE | 44 26 354 | 2/1996 |
| EP | 1 275 817 | 1/2003 |
| EP | 1 744 032 | 1/2007 |
| JP | 2-163402 | 6/1990 |
| JP | 8-177414 | 7/1996 |
| JP | 10-184317 | 7/1998 |
| JP | 11-117715 | 4/1999 |
| JP | 2013-151887 | 8/2013 |

OTHER PUBLICATIONS

International Search Report dated Jun. 30, 2015 in International (PCT) Application No. PCT/JP2015/060532.
Written Opinion of the International Searching Authority dated Jun. 30, 2015 in International (PCT) Application No. PCT/JP2015/060532.
Office Action dated Sep. 24, 2014 in Great Britain Application No. GB1405605.5.
Notification of Grant dated Jun. 21, 2016 in corresponding Great Britain Application No. GB1405605.5.

* cited by examiner

US 10,358,947 B2

COMBINED CYCLE GAS TURBINE PLANT

TECHNICAL FIELD

The present invention relates to a gas turbine plant, more particularly to a combined cycle gas turbine plant of single shaft configuration.

BACKGROUND ART

The power generation industry is highly competitive. There is a demand on gas turbine plant designers and manufacturers to provide improved operational efficiencies, particularly for use in electrical markets.

SUMMARY OF INVENTION

Single shaft combined cycle gas turbine plants have an axial compressor and steam turbine on the same shaft as the gas turbine. Without a clutch, the gas turbine, steam turbine and compressor always rotate at the same speed during operation. With a clutch, the gas turbine, steam turbine and compressor rotate at the same speed during operation when the shafts thereof are connected by the clutch.

For a typical start up mode, the gas turbine is activated and steam generation begins. Bypass valves are used to ensure that the steam is passed directly to a condenser (i.e. bypassing the steam turbine) until the steam has required conditions (e.g. temperature, pressure, chemical).

When the steam reaches the required conditions, the steam can be admitted into the steam turbine, via steam control valves. Opening of the steam control valves is synchronised with closing of the bypass valves, in order to maintain steam pressure. Eventually, the steam control valves are fully open and the bypass valves are fully closed, so that a sliding pressure mode of operation can begin.

For single shaft combined cycle plant, this mode of operation is useful when the output required from the plant is very high. However, if the demand decreases significantly, load capability should be restricted, eg. by more, than 50%.

There is a need to improve the load capability of combined cycle gas turbine plants to be reduced as much as possible maintaining a safe operation condition According to one aspect of the invention, there is provided a combined cycle gas turbine plant of single shaft configuration, as set forth in claim 1.

According to another aspect of the invention, there is provided a method of controlling a combined cycle gas turbine plant, as set forth in claim 11.

According to a further aspect of the invention, there is provided a control protocol for a combined cycle gas turbine plant of single shaft configuration, as set forth in claim 16.

Advantageously, the invention allows a single shaft combined cycle plant to operate at much lower loads than is currently possible, by operating on gas turbine output alone.

In exemplary embodiments, the steam turbine is held in heated 'stand-by' state under full speed (i.e. rated speed) no load. (hereinafter "FSNL") conditions. By keeping the steam turbine in effectively a 'hot start up' state, the plant is ready to quickly increase the load, if required.

In exemplary embodiments, when the steam turbine is running at FSNL conditions, small amounts of steam are injected into the steam turbine (i.e. with the steam control valves in a partially open state).

In exemplary embodiments, the steam admission to the steam turbine is regulated, in order to maintain a desired or minimum temperature level inside the steam turbine, when the steam turbine is operating in FSNL conditions. This has been found to reduce the minimum load capability of such plant, and also improve load variation response times.

In exemplary embodiments, the steam control valves are opened only a fraction of their normal operating capacity. Critically, the level of steam admission must remain below a threshold level, in order to prevent the production of power in the steam turbine. The result is a 'safe' warming of the steam turbine. Importantly, the rest of the steam is bypassed to the condenser by control of the bypass valves, i.e. as would occur during a typical start up operation. Operation of the steam control and bypass valves is synchronized to maintain pressure levels within the system.

The invention provides load reduction capability for a single-shaft combined cycle plant, in particular through regulated operation of the steam turbine in a FSNL condition.

Other aspects and features of the invention will be apparent from the following description of exemplary embodiments, made with reference to the accompanying drawings.

DESCRIPTION OF EMBODIMENTS

Figure 1:
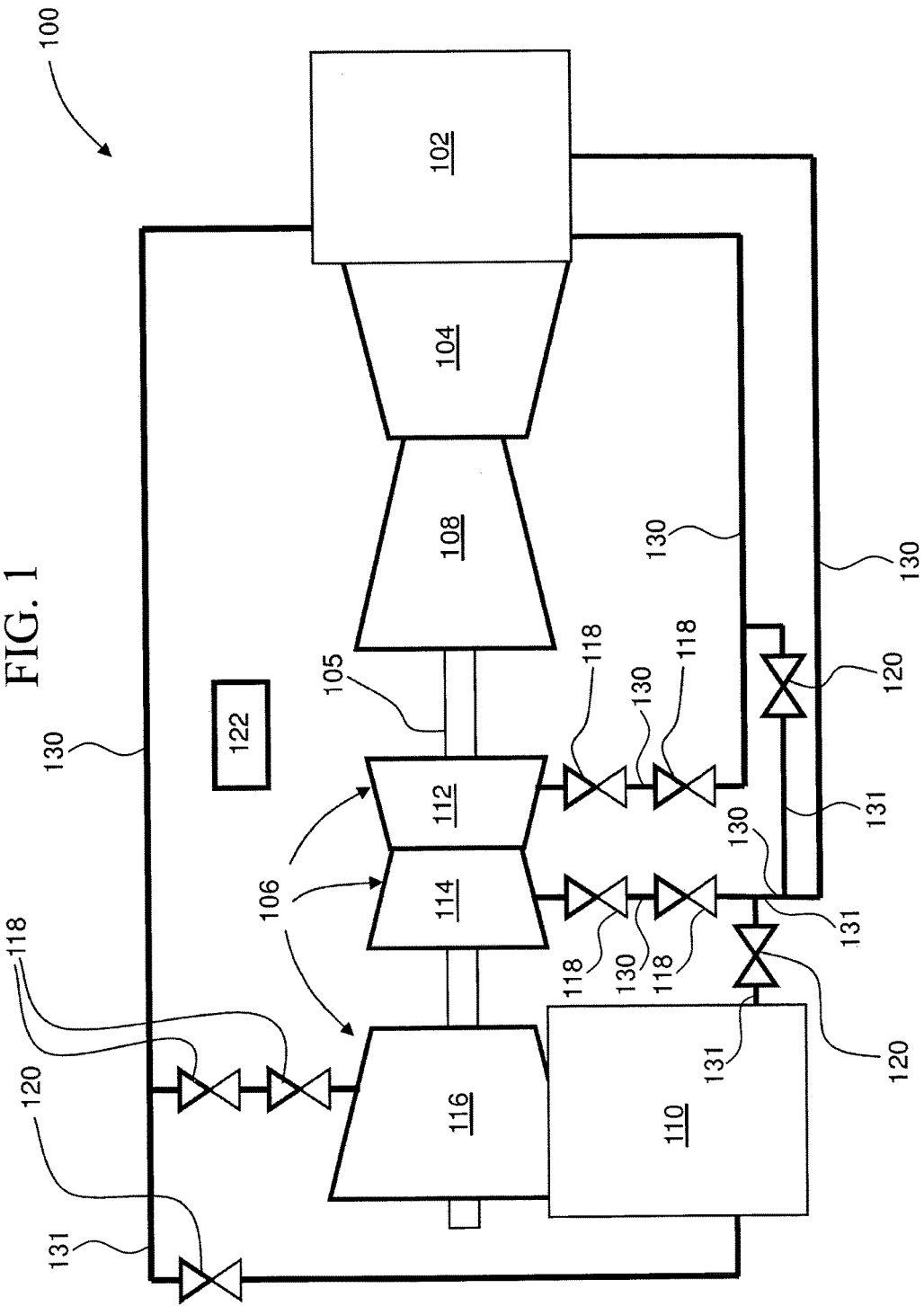
FIG. 1 is a schematic diagram showing a combined cycle gas turbine plant of single shaft configuration, in a 'stand still' state.

FIGS. 1 to 5 show a combined cycle gas turbine plant 100 of single shaft configuration.

The plant 100 includes a heat recovery steam generator 102 (hereinafter "HRSG"), a gas turbine 104 (hereinafter "GT"), a steam turbine 106 (hereinafter "ST") and an axial compressor 108. The compressor 108 and ST 106 are mounted on the same shaft 105 as the GT 104, and so these three major elements of the plant 100 rotate at the same speed during operation. The plant 100 also includes a condenser 110. The ST 106 and the compressor 108 sharing the same shaft with the GT 104 may be connected through a clutch.

In this embodiment, the plant 100 includes, as shown in FIGS. 1-5, the following elements: supply lines 130 for supplying generated steam from the heat recovery steam generator 102 to the steam turbine 106, which has three stages 112, 114, 116 as described below; bypass lines 131 one end of which are connected to the supply lines 130 between the heat recovery steam generator 102 and the steam turbine 106, and the other end of which are connected to the condenser 110; steam control valves 118 provided in the supply lines; and bypass valves 120 provided in the bypass lines 131. As shown in FIGS. 1-5, a part of the supply line 130, which connects the heat recovery steam generator 102 and the high pressure stage 112 of the steam turbine 106, serves as a part of the bypass line 131 for connecting said supply line 130 and the condenser 110.

As can be seen, the ST 106 is of multi-stage configuration, having high pressure, intermediate pressure and low pressure stages 112, 114, 116 (hereinafter HP, IP and LP stages), from right to left as viewed in FIG. 1.

The plant 100 includes the steam control valves 118, which are used to control the admission of steam from the HRSG 102 into the ST 106. The plant 100 further includes the bypass valves 120, which are used to permit a flow of steam from the HRSG 102 to the condenser 110 (i.e. so as to bypass the ST 106). Specifically, the bypass valves 120 allow the steam flowing in the supply lines 130 toward the steam turbine to flow into the bypass lines 131 and then into the condenser 110.

FIG. 1 shows the plant 100 in a 'stand still' state, wherein the shaft 105 is not rotating and the valves 118, 120 are closed.

Figure 2:
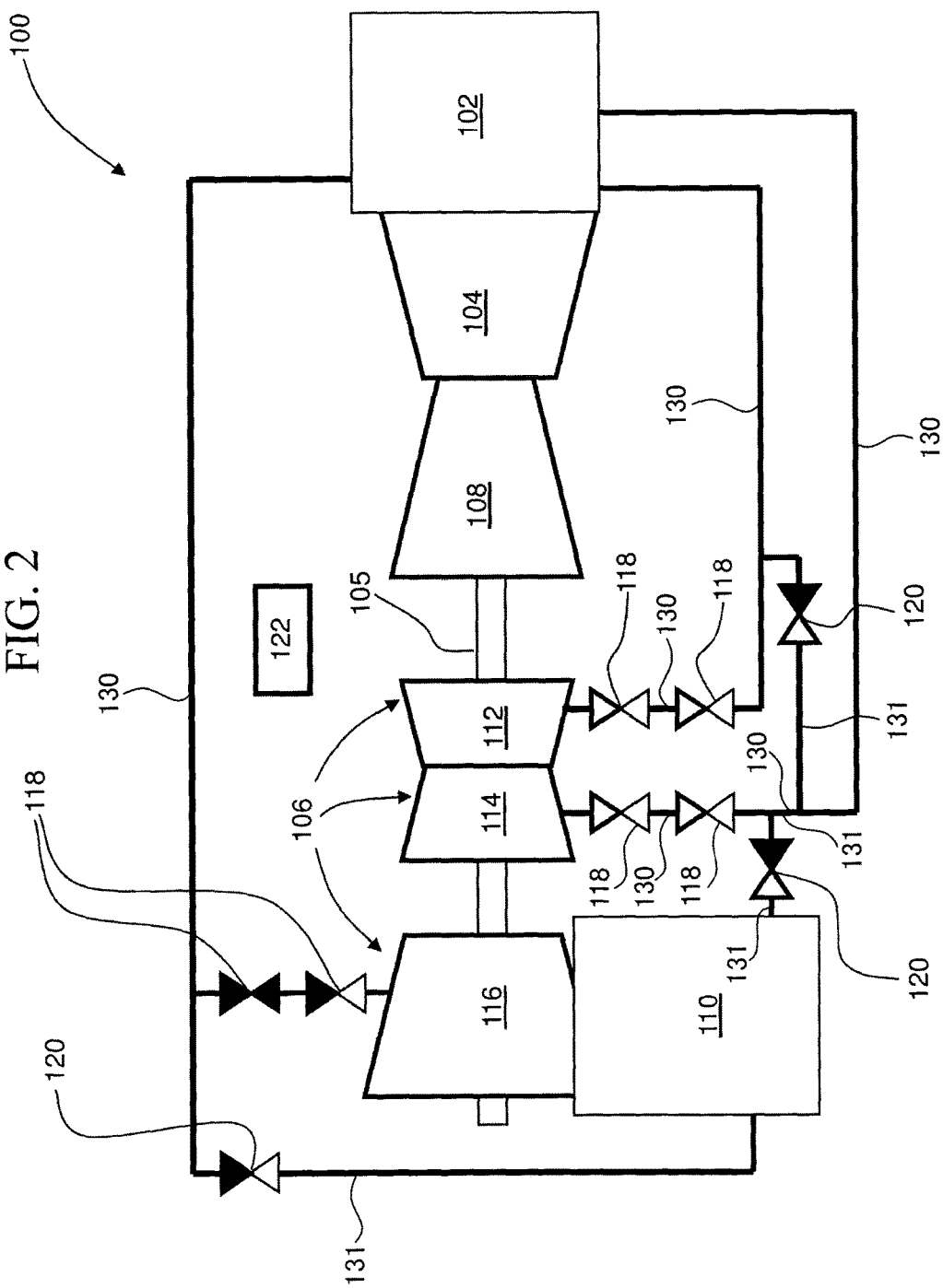
FIG. 2 is similar to FIG. 1, and shows the plant in an initial start up state.

For a typical start up mode, the GT 104 is activated and steam generation begins. This 'start up state' is shown in FIG. 2. The bypass valves 120 are partially opened, to allow the steam to be passed directly to the condenser 110. More particularly, the steam is directed to bypass the HP and IP stages 112, 114 of the ST 106). However, as can be seen in FIG. 2, it may be desirable to allow the steam control valves 118 for the LP stage 116 of the ST 106 to be at least partially open, in order to all some steam to enter the LP stage 116 and to cool down the last stage of blades.

Figure 3:
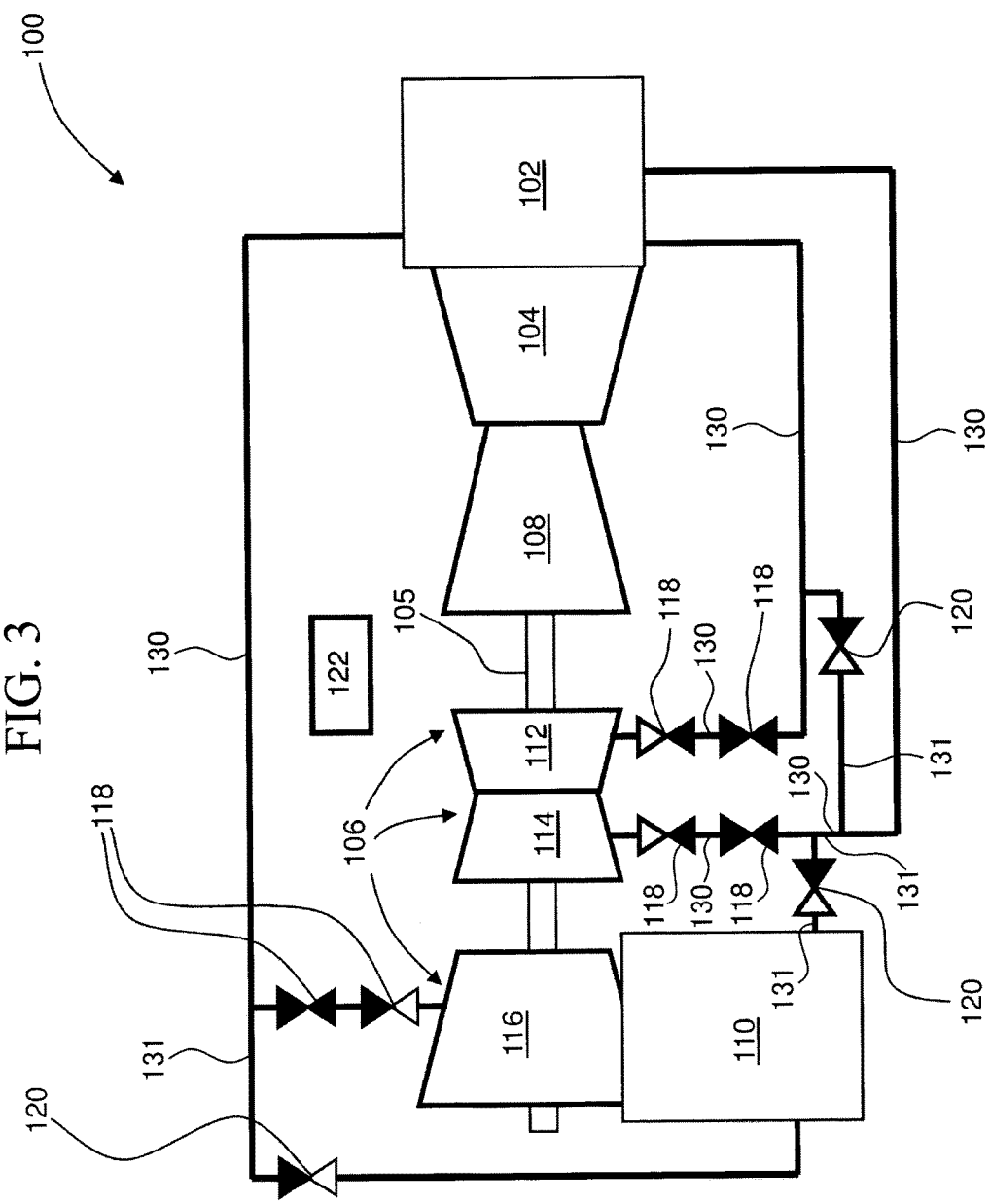
FIG. 3 is similar to FIGS. 1 and 2, and shows the plant in an initial steam admission state.
Figure 4:
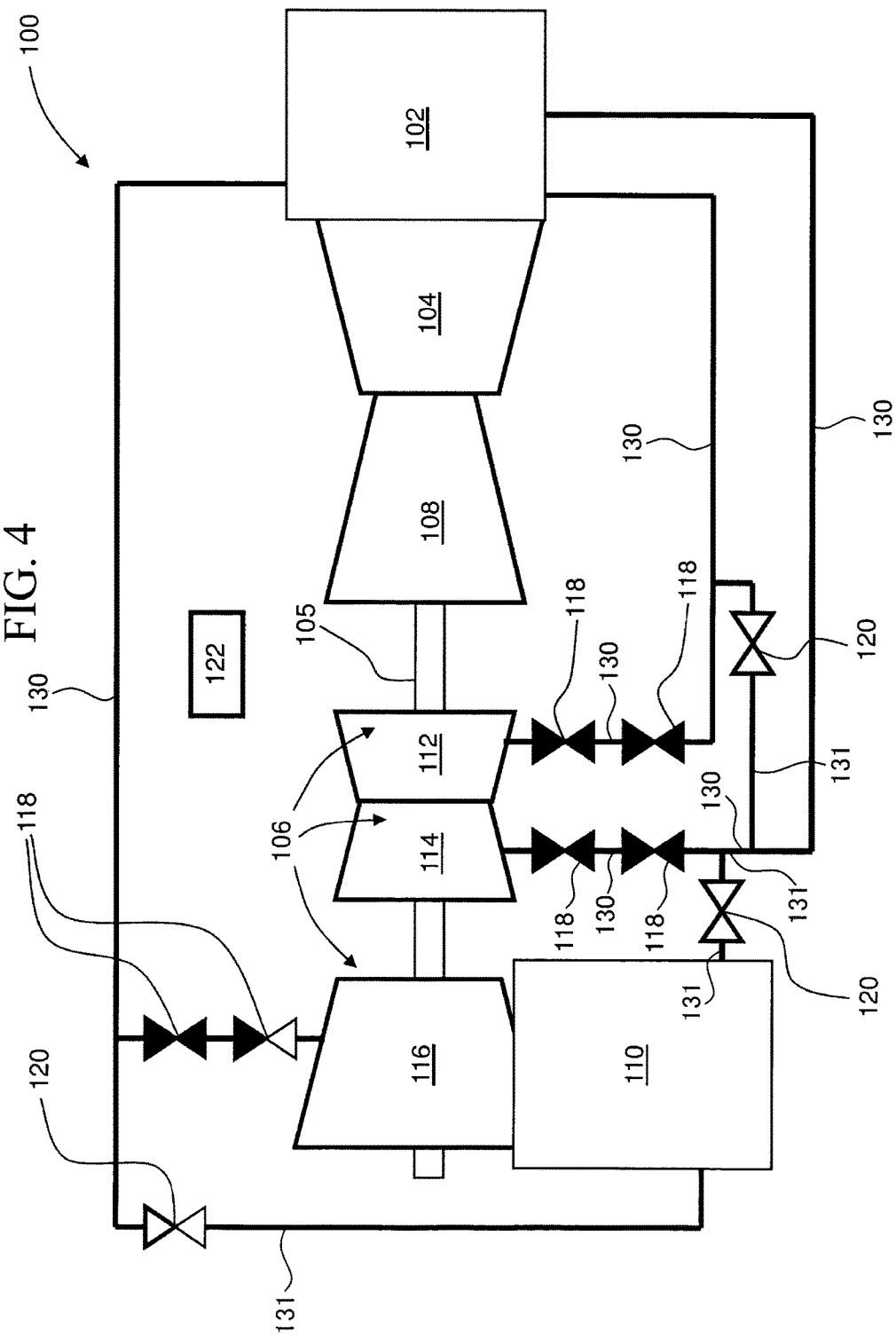
FIG. 4 is similar to FIGS. 1 to 3, and shows the plant in a sliding pressure state.

Once the steam is deemed to have the desired parameters (e.g. optimum temperature and/or pressure and/or chemical nature), the steam can be admitted into the HP and IP stages 112, 114 of the ST 106. This 'steam admission' state is shown in FIG. 3, in which the steam control valves 118 for the HP and IP stages 112, 114 of the ST 106 are partially opened. Importantly, opening of the steam control valves 118 is synchronized with closing of the bypass valves 120, in order to maintain steam pressure. Eventually, the steam control valves 118 are fully open and the bypass valves 120 are fully closed, so that a sliding pressure mode of operation can begin (as shown in FIG. 4).

The plant 100 includes a control system 122 for operating the valves 118 and 120.

If the plant 100 is operating at rated speed and there is a need to reduce the load significantly (e.g. if demand decreases significantly), the control system 122 is configured to switch to a 'load reduction' mode of operation. In this mode of operation, the control system is configured to open the bypass valves 120 and thereby allow steam to bypass the HP and IP stages 112, 114 of the ST 106. As a result, the ST 106 will then operate under FSNL conditions. Accordingly, the plant 100 operates on output from the GT 104 alone in the load reduction mode.

Figure 5:
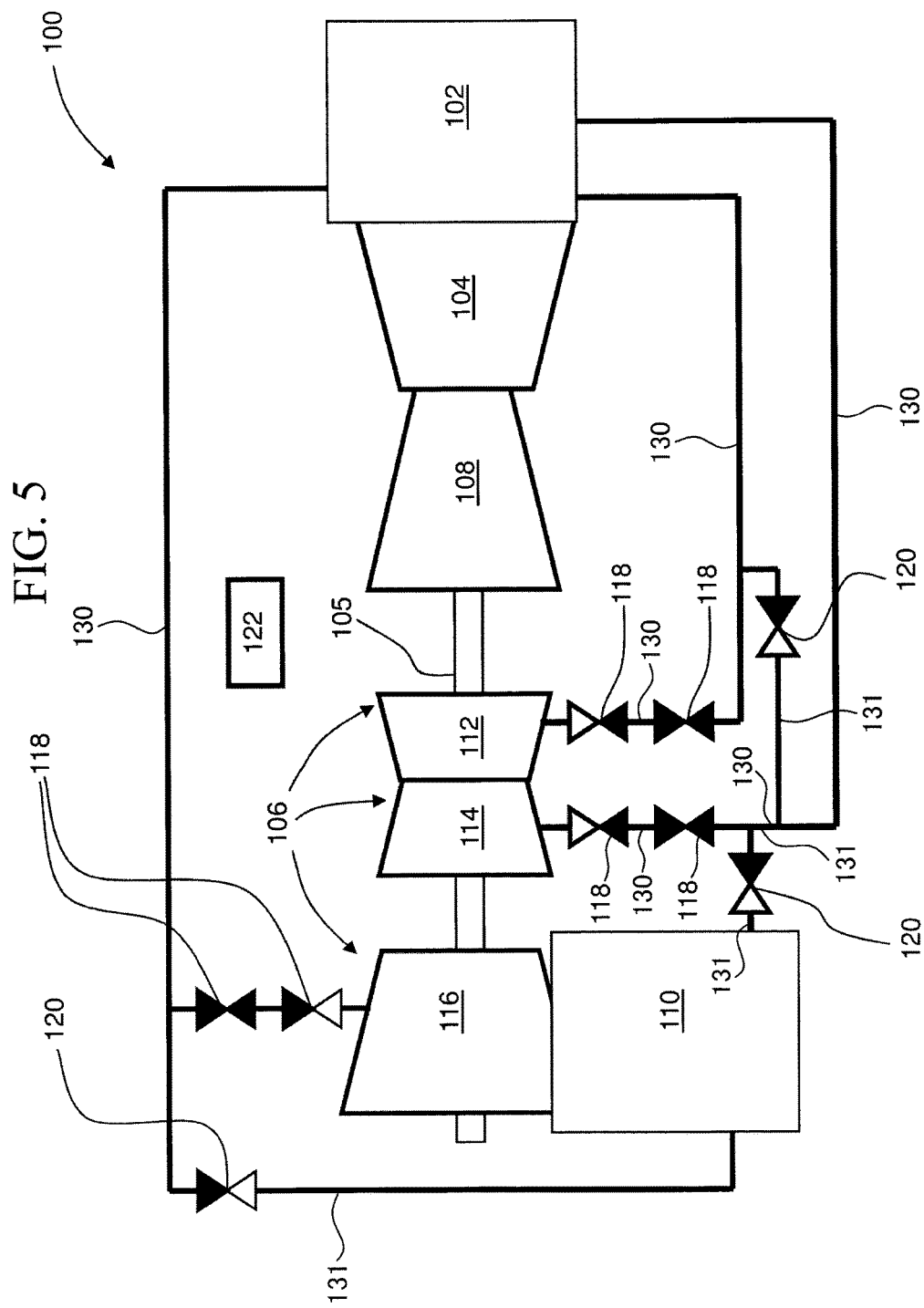
FIG. 5 is similar to FIGS. 1 to 4, and shows the plant with the steam turbine operating in FSNL conditions.

The control system 122 is further programmed to allow small amounts to steam to be admitted (e.g. via injection nozzles) to the HP and IP stages 112, 114 of the ST 106, when the ST 106 is running at FSNL conditions in the load reduction mode. This is shown in FIG. 5.

More particularly, the control system is configured to regulate the steam control valves 118 for the HP and IP stages 112, 114 of the ST 106. These valves 118 are held in a partially open state (e.g. at only a fraction of their normal operating capacity), in order to maintain a desired or minimum temperature level inside the HP and IP stages 112, 114 of the ST 106 when the ST 106 is operating in FSNL conditions.

Although each the valves 118 are held in the partially open state in the load reduction mode to allow part of the steam which is flowing in the supply line 130 toward the steam turbine 106 to flow into the bypass line 131 in the aforementioned explanation, each of the valves 118 may be held fully closed in the load reduction mode to allow all of the steam which is flowing in the supply line 130 toward the steam turbine 106 to flow into the bypass line 131.

Critically, the level of steam admission is controlled to remain below a threshold level, in order to prevent the production of power in the ST 106. The result is a 'safe' warming of the ST 106. Importantly, the rest of the steam is bypassed to the condenser 110 by control of the bypass valves 120, i.e. as would occur during a typical start up operation.

This method of operating the ST at FSNL conditions whilst maintaining a suitable operating temperature has been found to reduce the minimum load capability of such kinds of plant, and also improve load variation response times. The plant is able to switch back to a rated mode of operation quickly, without causing undue metal stress within the ST.

The invention provides efficient load reduction capability for a single-shaft combined cycle plant, in particular through regulated operation of the steam turbine in a FSNL condition, wherein the plant is operated on GT output alone. Essentially, the invention involves switching the ST to a FSNL operation in the middle of a rated load mode of operation. In effect, this allows the plant to enter a turndown operation, wherein the shaft output can be reduced significantly, e.g. to one-third of the rated output of the plant. Excess steam is bypassed to the condenser (as would occur in a typical start up mode). However, by regulating the amount of steam being admitted into the ST (whilst maintaining the ST in a full speed no load condition), the ST is kept warm. Hence, the load can be quickly increased if the demand increases, i.e. by switching the plant quickly back to the normal rated load mode of operation.

With regard to FIGS. 1 to 5, it should be noted that a valve in white indicates a "closed" valve, a valve in black indicates an "open" valve, and a valve in white and black indicates a "partially open" valve.

The aforementioned invention includes the following aspects.

An aspect of the present invention provides a control protocol (program) for a control system of a combined cycle gas turbine plant of single shaft configuration, the control protocol is for making the plant perform the following steps or for making the control system 122 perform the following steps: monitoring plant demand; and switching the plant from a rated mode of operation, in which the plant is operated on gas turbine output and steam turbine output, to a reduced load mode of operation, in which the plant is operated on gas turbine output alone, if the plant demand decreases below a predetermined threshold.

The protocol may comprise the step of running the steam turbine under full speed no load conditions in the reduced load mode of operation.

The protocol may comprise the step of maintaining the steam turbine in a heated 'stand-by' state under FSNL conditions during the reduced load mode of operation.

The protocol may comprise the step of controlling steam admission in order to maintain a desired or predetermined minimum temperature inside the steam turbine when the steam turbine is operating in full speed no load conditions.

The protocol may comprise the step of controlling the level of steam admission to the steam turbine below a threshold level, in order to prevent the production of power in the steam turbine during FSNL conditions.

The protocol may comprise the step of operating steam control valves to control steam admission to the steam turbine during FSNL conditions.

The protocol may comprise the step of operating bypass valves to divert excess steam to a condenser during FSNL conditions.

REFERENCE SIGNS LIST 100 plant
104 gas turbine
105 shaft
106 steam turbine
108 compressor
110 condenser
118 steam control valve
120 bypass valve

The invention claimed is:

1. A combined cycle gas turbine plant of single shaft configuration, wherein the plant has a gas turbine and a steam turbine mounted on the single shaft, and wherein the plant comprises a control system configured for switching the plant from a rated mode of operation, in which the plant is operated on gas turbine output and steam turbine output, to a reduced load mode of operation, in which the plant is operated on gas turbine output alone,
the control system is configured to switch from the rated mode of operation to the reduced load mode of operation if plant demand decreases below a predetermined threshold.

2. A combined cycle gas turbine plant as set forth in claim 1, wherein the control system is configured to run the steam turbine under full speed no load conditions in the reduced load mode of operation.

3. A combined cycle gas turbine plant as set forth in claim 1, wherein the control system is configured to maintain the steam turbine in a heated 'stand-by' state under full speed no load conditions during the reduced load mode of operation.

4. A combined cycle gas turbine plant as set forth in claim 1, wherein the control system is configured to maintain a desired or minimum temperature level inside the steam turbine when the steam turbine is operating in full speed no load conditions.

5. A combined cycle gas turbine plant as set forth in claim 2, wherein the control system is configured to regulate the level of steam admission to the steam turbine under full speed no load conditions.

6. A combined cycle gas turbine plant as set forth in claim 1, wherein the steam turbine is a multi stage steam turbine, and the plant includes steam control valves for controlling the admission of steam to one or more stages of the steam turbine, and further wherein the control system is configured to open the steam control valves to only a fraction of their normal operating capacity when the steam turbine is operating under full speed no load conditions.

7. A combined cycle gas turbine plant as set forth in claim 5, wherein the control system is configured to keep the level of steam admission to the steam turbine below a threshold level, in order to prevent the production of power in the steam turbine during full speed no load conditions.

8. A combined cycle gas turbine plant as set forth in claim 5, wherein the control system is configured to operate bypass valves to allow excess steam to bypass the steam turbine and allow the excess steam to be delivered to a condenser during regulation of steam admission to the steam turbine under full speed no load conditions.

9. A combined cycle gas turbine plant as set forth in claim 1, wherein the control system is configured to re-switch from the reduced load mode of operation to the rated mode of operation if the plant demand increases beyond a predetermined threshold.

10. A combined cycle gas turbine plant as set forth in claim 1, further comprising:
a supply line for supplying steam from a steam generator to the steam turbine;
a bypass line one end of which is connected to the supply line between the steam generator and the steam turbine; and
a bypass valve provided in the bypass line,
wherein the control system is configured to switch the plant from the rated mode to the reduced load mode by opening the bypass valve to make part of or all of the steam which is flowing in the supply line and which is flowing toward the steam turbine flow into the bypass line, and wherein the bypass valve is closed in the rated mode.

11. A method of controlling a combined cycle gas turbine plant of single shaft configuration, the method comprising the steps of monitoring plant demand, and switching the plant from a rated mode of operation, in which the plant is operated on gas turbine output and steam turbine output, to a reduced load mode of operation, in which the plant is operated on gas turbine output alone, if the plant demand decreases below a predetermined threshold.

12. A method according to claim 11, the method comprising the step of running the steam turbine under full speed no load conditions in the reduced load mode of operation.

13. A method according to claim 11, the method comprising the step of maintaining the steam turbine in a heated 'stand-by' state under full speed no load conditions during the reduced load mode of operation.

14. A method according to claim 11, the method comprising the step of controlling steam admission in order to maintain a desired or predetermined minimum temperature inside the steam turbine when the steam turbine is operating in full speed no load conditions.

15. A method according to claim 11, the method comprising the step of controlling the level of steam admission to the steam turbine below a threshold level, in order to prevent the production of power in the steam turbine during full speed no load conditions.

16. A method according to claim 11, the combined cycle gas turbine plant comprises:
a supply line for supplying steam from a steam generator to the steam turbine;
a bypass line one end of which is connected to the supply line between the steam generator and the steam turbine; and
a bypass valve provided in the bypass line,
wherein, the method switches the plant from the rated mode to the reduced load mode by opening the bypass valve to make part of or all of the steam which is flowing in the supply line and which is flowing toward the steam turbine flow into the bypass line, and wherein the bypass valve is closed in the rated mode.

17. A control system of a combined cycle gas turbine plant of single shaft configuration, wherein the control system is configured to perform:
monitoring plant demand, and switching the plant from a rated mode of operation, in which the plant is operated on gas turbine output and steam turbine output, to a reduced load mode of operation, in which the plant is operated on gas turbine output alone, if the plant demand decreases below a predetermined threshold.

18. A system according to claim 17, wherein the system is configured to perform running the steam turbine under full speed no load conditions in the reduced load mode of operation.

19. A system according to claim 17, wherein the system is configured to perform maintaining the steam turbine in a heated 'stand-by' state under full speed no load conditions during the reduced load mode of operation.

20. A system according to claim 17, wherein the system is configured to perform controlling steam admission in order to maintain a desired or predetermined minimum temperature inside the steam turbine when the steam turbine is operating in full speed no load conditions.

21. A system according to claim 17, wherein the system is configured to perform controlling the level of steam admission to the steam turbine below a threshold level, in order to prevent the production of power in the steam turbine during full speed no load conditions.

22. A system according to claim 19, wherein the system is configured to perform operating steam control valves to control steam admission to the steam turbine during full speed no load conditions.

23. A system according to claim 22, wherein the system is configured to perform operating bypass valves to divert excess steam to a condenser during full speed no load conditions.

* * * * *